United States Patent
Zhang et al.

(10) Patent No.: US 9,689,055 B2
(45) Date of Patent: Jun. 27, 2017

(54) COMPLETE NON-CYANOGENS WET PROCESS FOR GREEN RECYCLING OF WASTE PRINTED CIRCUIT BOARD

(75) Inventors: Shengen Zhang, Beijing (CN); Bin Li, Beijing (CN); Dean Pan, Beijing (CN); Jianjun Tian, Beijing (CN); Bo Liu, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 13/598,177

(22) Filed: Aug. 29, 2012

(65) Prior Publication Data

US 2012/0318681 A1    Dec. 20, 2012

Related U.S. Application Data

(63) Continuation of application No. PCT/CN2010/077935, filed on Oct. 21, 2010.

(30) Foreign Application Priority Data

May 28, 2010  (CN) .......................... 2010 1 0194555

(51) Int. Cl.
*C22B 3/20* (2006.01)
*C22B 11/00* (2006.01)
(Continued)

(52) U.S. Cl.
CPC .............. *C22B 11/046* (2013.01); *C22B 7/00* (2013.01); *C22B 15/0056* (2013.01); *C25C 1/12* (2013.01);
(Continued)

(58) Field of Classification Search
CPC ....... C25C 1/12; C22B 11/046; C22B 13/045; C22B 15/0089; C22B 25/04; C22B 7/00;
(Continued)

(56) References Cited

U.S. PATENT DOCUMENTS 2,260,670 A * 10/1941 Humphries ...................... 75/419
3,996,046 A * 12/1976 Hoffmann et al. .............. 75/427
(Continued)

FOREIGN PATENT DOCUMENTS

CN    1229008    9/1999
CN    1238244    12/1999
(Continued)

OTHER PUBLICATIONS

Amer. Processing of Copper Anode-Slimes for Extraction of Metal Values. Physicochemical Problems of Mineral Processing. pp. 123-134. 2002.*

(Continued)

*Primary Examiner* — Ciel Thomas
(74) *Attorney, Agent, or Firm* — Novick, Kim & Lee, PLLC; Allen Xue

(57) ABSTRACT

The invention related to the recycling field of waste printed circuit boards (WPCB), and especially involved a complete non-cyanogens wet process for green recycling of WPCB, which belonged to the field of recycle economy. In the invention, the process included that WPCB were broken by the jaw crusher, and then mixed copper powders and non-metallic powders were separated by the method of air classification, the mixed copper powders were smelted and casted to get copper anode plates, the copper was purified by electrolytion, the valuable metals (such as copper, gold, silver, platinum and palladium, lead and tin) were recycled from the copper anode slime, and the waste water was recycled. The recovery ratio of all-metal was above 98%.

(Continued)

The purity of the cathode copper was up to 4N level. The ratio of de-coppering was above 96%. The recovery ratio of gold was above 98.

18 Claims, 7 Drawing Sheets

(51) Int. Cl.
    *C22B 13/00*     (2006.01)
    *C22B 15/00*     (2006.01)
    *C22B 25/00*     (2006.01)
    *C25C 1/12*     (2006.01)
    *C22B 3/00*     (2006.01)
    *C22B 7/00*     (2006.01)

(52) U.S. Cl.
    CPC .............. *Y02P 10/214* (2015.11); *Y02P 10/22* (2015.11); *Y02P 10/228* (2015.11); *Y02P 10/236* (2015.11)

(58) Field of Classification Search
    CPC ... C22B 15/0056; C22B 25/06; Y02P 10/214; Y02P 10/22; Y02P 10/228; Y02P 10/236
    USPC .................................................. 205/574–586
    See application file for complete search history.

(56) References Cited

U.S. PATENT DOCUMENTS

| | | | | | |
|---|---|---|---|---|---|
| 4,135,993 | A | * | 1/1979 | Um | C22B 13/06 205/369 |
| 4,283,224 | A | * | 8/1981 | Stewart | 75/714 |
| 4,500,496 | A | * | 2/1985 | Austin | C22B 1/00 423/34 |
| 4,670,052 | A | * | 6/1987 | Stanley et al. | 75/736 |
| 5,683,040 | A | | 11/1997 | Jakob et al. | |
| 5,766,440 | A | * | 6/1998 | Ino et al. | 205/99 |
| 5,849,171 | A | * | 12/1998 | Dahms et al. | 205/298 |
| 5,885,535 | A | * | 3/1999 | Asano et al. | 423/24 |
| 6,511,591 | B1 | * | 1/2003 | Virtanen et al. | 205/574 |
| 2003/0129112 | A1 | * | 7/2003 | Vinals Olia et al. | 423/22 |
| 2005/0118081 | A1 | * | 6/2005 | Harris et al. | 423/22 |
| 2007/0022840 | A1 | * | 2/2007 | Heguri | C01G 5/02 75/370 |
| 2007/0062335 | A1 | * | 3/2007 | Lindroos et al. | 75/418 |
| 2009/0013829 | A1 | * | 1/2009 | Harris et al. | 75/710 |

FOREIGN PATENT DOCUMENTS

| | | | |
|---|---|---|---|
| CN | 1396281 | | 2/2003 |
| CN | 1535760 | | 10/2004 |
| CN | 1611309 | | 5/2005 |
| CN | 100406591 | | 7/2008 |
| CN | 101230470 | | 7/2008 |
| CN | 101555550 | | 10/2009 |
| CN | 101555550 | A * | 10/2009 ............... C22B 7/04 |
| CN | 101569889 | | 11/2009 |
| CN | 101831553 | | 9/2010 |
| GB | 425648 | | 3/1935 |
| JP | 5-247552 | | 9/1993 |
| JP | 2005-000841 | | 1/2005 |
| JP | 2008-194618 | | 8/2008 |

OTHER PUBLICATIONS

Hait et al. Some Studies on Sulfuric Acid LEaching of Anode Slime with Additives. Industrial Engineering Chemical Research. pp. 6593-6599. 2002.*

* cited by examiner

COMPLETE NON-CYANOGENS WET PROCESS FOR GREEN RECYCLING OF WASTE PRINTED CIRCUIT BOARD

TECHNICAL FIELD

The invention relates to the recycling field of waste printed circuit boards (WPCB), and especially involves a complete non-cyanogens wet process for green recycling of WPCB, which is used to handle with the WPCB recycled.

BACKGROUND

With the development of economy and the progress of science and technology, the advanced technology about electrical appliance in the field of high and new technology emerges in endlessly, and the electrical appliance industry becomes one of the most rapid development industries in 20th century. Because of the use of electronic products and the progress of related technology, the abandonment and update cycle time of electronic products continuously shortened, and the number of electronic waste was growing day by day. The United States produces the largest number of electronic products and electronic junk in the world, while the production of electronic waste is as high as 700 to 800 million tons every year, and the number is becoming more and more larger. The amount of electronic waste of the whole Europe is about 6 million tons every year, Germany is 1.8 million tons, and France is 1.5 million tons. Since 2007, China had reached the home appliance update peak. It is about 5 million TV sets, 4 million refrigerators, 6 million washing machines, 10 million computers and tens of millions of mobile phones scraped every year. The United Nations Environment Programme (UNEP) issued a report called "the electronic waste recycling-for resources", which showed that waste computers, printers, mobile phones, audio-visual equipments, refrigerators, toys and TV sets and other electronic junk are growing by 40 million tons per year. The situation in the developing countries, where the economic growth speed is faster and faster, is especially worrying. "By the year 2020, the number of waste computers will be double or more than two times of 2007 in South Africa and China, and 5 times in India. By then, the number of abandoned mobile phones in China will grow to 7 times, and which will increases 18 times in India. Besides the number of abandoned televisions will increased by 1.5 to 2 times in China and India, the number of abandoned fridges will grow by 2 to 3 times in India". Electronic waste is becoming a new hazardous waste pollution source.

WPCB are the part, which is the most difficult to deal with, and has the heaviest burden to the environment, and has also the highest added value in Electronic waste. Printed circuit boards are made of the resin and a variety of metal mixes. If they are not properly treated, the brominated flame retardants carcinogen and heavy metal, which are contained in the printed circuit boards, will do a great harm to soil and human health. But the WPCB contain a variety of valuable metals (such as Cu, Pb and Sn) and precious metals (such as Au, Ag, Pt and Pd). The content of these metals in WPCB is a few times higher or tens of times higher than the ordinary mineral. So the recycling of the valuable metals in WPCB can bring high economic value.

Pyrometallurgical process was used to get metallurgy metal from WPCB in traditional methods. The WPCB were burned to remove the substrate organic materials, and then the simple metal substance was formed from the rest metals by smelting and electrolytic reaction. There were organic produced a lot of poisonous and harmful gas by organic matter burned, what can cause serious pollution on the environment by only a little emissions. It was difficult to treat with the waste gas, and the equipment investment is large. In order to avoid pollution, there were several physical methods about the recycling process of the WPCB proposed one after another at home and abroad. For example, U.S. Pat. No. 5,683,040 putted forward a kind of mechanical and physical method, in which the electronic devices of the circuit boards were taken apart and the undamaged electronic devices were recycled. After the circuit boards crushed and grinded, and the metallic and nonmetallic were separated through the sorting equipments. During China's patent 99102862.7, 02121434.4, 03113180.8 and 200310103403, WPCB were separated to the metallic and nonmetallic by the methods of mechanical broken and magnetic separation. With these methods, the costs of equipments production were high, and ultimately the metallic and nonmetallic powders were obtained. The metal simple substance cannot be obtained completely, so that it had a low added value. It was reported in China's patent 98105592.3 that there was a kind of metal crushing reaction method for metal simple substance recycling. But the process was complex, the recovery efficiency was low, the production equipment investment cost was high and energy consumption was huge. A method about the recovery of copper and aluminum metal from WPCB was mentioned in Japan's patent JP2005000841 and China's patent 200610117802.6. But the method was complex, the recovery efficiency was low, and it was only for a certain metal recycling, so that it can't achieve the goal of valuable metals' comprehensive recycling from WPCB. In China's patent 200710176776.9, it was referred to a kind of method about classification electrolysis for the metal recovery in electronic waste. It can recover the Cu, Zn, Pb, Ag, Pt and Au in WPCB by fractional electrolysis. But the aqua regia and other acid were used in this method, which can strength the environmental burden. And all the metals were recycled by the electrolysis process, which had high energy consumption and large recovery cost.

SUMMARY

The purpose of this invention is to provide a method to recycle WPCB by using the complete non-cyanogens wet green recycling process. This method includes mechanical broken, gravity separation, miscellaneous copper powders smelting, copper electrolytic purification, copper anode slime for recovering the valuable metals (such as copper, gold, silver, platinum and palladium, lead and tin), and waste water recycling. And this method is with non-cyanogens wet, wastewater recycling, and without secondary pollution.

The present invention of the complete non-cyanogens wet process for the green recycling of WPCB is the method to recover the valuable metals from the WPCB by using complete non-cyanogens wet process. The specific steps are following:

1) With the WPCB Broken up, the mixed copper powders and nonmetallic powders were obtained by gravity separation. Copper anode plates were by casted by miscellaneous copper powders smelting.

2) The copper anode plates were put in the mixed solution of $CuSO_4$ and $H_2SO_4$ to be electrolyzed and purified, and then to get cathode copper and copper anode slime. The purity of the cathode copper was up to 4N level. In the process of copper electrolyzation and purification, the concentration of $H_2SO_4$ was 0.5~2 mol/L, the concentration of $CuSO_4$ was 0.2~1.5 mol/L, the concentration of gelatin was 50~300 mg/L, the concentration of thiourea was 50~300 mg/L, the current density is 100~500 A/m2, and electrolytic temperature was 30~80° C.

3) Mixing copper anode slime with the solution of H2SO4 and NaCl, MnO2 was added to recover copper. The solution and slag of de-coppering were got by filtering. The solution of de-coppering was returned to the process of copper electrolyzation and purification. The recovery ratio of copper was above 96%. In the process of de-coppering, the concentration of H2SO4 was 0.5~5 mol/L, the concentration of NaCl was 0.1~5 mol/L, the amount of MnO2 added was 2~40% of anode slime, the solid-to-liquid ratio was 1:4~1:20, the reaction temperature was 30~90° C., and the reaction time was 0.5~5 h.

4) The slag of de-coppering was put in the mixed solution of NaCl, H2SO4 and NaClO3 to recover gold. The solution and slag of de-golding were got by filtering. The solution of de-golding was reduced to rough gold powders by Na2SO3 and the residual solution was the remanent reduction liquid of de-golding. The recovery ratio of gold was above 98%. In the process of de-golding, the concentration of NaCl was 20~100 g/L, the concentration of H2SO4 was 50~300 g/L, the molar ratio of NaClO3 and NaCl was 1:5~3:5, the solid-to-liquid ratio was 1:4~1:20, the reaction temperature was 50~95° C., reaction time was 0.5~5 h. The concentration of Na2SO3 for gold reduced was 70~280 g/L, the reduction temperature was 10~50° C., and the reduction time was 5~60 min.

5) Platinum and palladium concentrate was obtained by adding metathesis metal in the remanent reduction liquid of de-golding. The recovery ratio of platinum and palladium was above 96%. The pH value of remanent reduction liquid was adjusted to 0~2, and the replacement reaction temperature was 10~50° C. Until the pH value of remanent reduction liquid was adjusted to 2.5~3, stop adding the metathesis metals, which were one or mixed powders of zinc and iron.

6) The slag of de-golding was put in the solution of Na2SO3 to recover silver. The solution and slag of de-silvering were got by filtering. The solution of de-silvering was reduced to rough silver powders. The recovery ratio of silver was above 95%. The concentration of Na2SO3 was 70~280 g/L, the solid-to-liquid ratio was 1:4~1:20, the reaction temperature was 20~50° C., the reaction time was 0.5~5 h, and the pH value of de-silvering solution was 11~14. The reducing agent was formaldehyde or oxalic acid. The quality ratio of the reducing agent and silver was 1:5~5:5.

7) The slag of de-silvering was heated in the mixed solution of HCl, NaCl and CaCl2 to recover lead. The solution and slag of de-leading were got by filtering. The solution of de-leading was cooled to dissolve out PbCl2, and the residual solution was the remanent reduction liquid of de-leading, which was returned to the process of de-leading. The recovery ratio of lead was above 95%. In the process of de-leading, the concentration of HCl was 10~200 g/L, the concentration of NaCl was 50~350 g/L, the concentration of CaCl2 was 10300 g/L, the total concentration of chloride ion was 3~6.5 mol/L, the solid-to-liquid ratio was 1:5~1:30, the reaction temperature was 70~110° C., and the reaction time was 0.5~5 h. The regeneration process for remanent reduction liquid of de-leading was that adding CaCl2 to make the concentration to 10~300 g/L.

8) The slag of de-leading and NaOH were mixed, which were roasted to recover tin. The solution and slag of de-tinning were got by calcined sands water quenching and filtering. To get Na2SnO3, the solution of de-tinning was evaporated and crystallized. The recovery ratio of tin was above 90%. The quality ratio of the de-leading slag and NaOH was 1:1~10:1, the roasting temperature was 300~600° C., and the roasting time was 0.5~5 h.

The optimized specific steps about the complete non-cyanogens wet process for green recycling of waste circuit boards was following:

1) With the WPCB Broken up, the mixed copper powders and nonmetallic powders were obtained by gravity separation. Copper anode plates were by casted by miscellaneous copper powders smelting.

2) The copper anode plates were put in the mixed solution of CuSO4 and H2SO4 to be electrolyzed and purified, and then to get cathode copper and copper anode slime. In the process of copper electrolyzation and purification, the concentration of H2SO4 was 1~2 mol/L, the concentration of CuSO4 was 0.5~1 mol/L, the concentration of gelatin was 50~100 mg/L, and the concentration of thiourea was 100~150 mg/L.

3) Mixing copper anode slime with the solution of H2SO4 and NaCl, MnO2 was added to recover copper. The solution and slag of de-coppering were got by filtering. In the process of de-coppering, the concentration of H2SO4 was 1~2 mol/L, the concentration of NaCl was 0.5~2 mol/L, the amount of MnO2 added was 10~20% of anode slime, and the solid-to-liquid ratio was 1:5~1:10.

4) The slag of de-coppering was put in the mixed solution of NaCl, H2SO4 and NaClO3 to recover gold. The solution and slag of de-golding were got by filtering. The solution of de-golding was reduced to rough gold powders by Na2SO3 and the residual solution was the remanent reduction liquid of de-golding. In the process of de-golding, the concentration of NaCl was 20~100 g/L, the concentration of H2SO4 was 100~200 g/L, the solid-to-liquid ratio was 1:5~1:10, and the concentration of Na2SO3 for gold reduced was 150~250 g/L.

5) Platinum and palladium concentrate was obtained by adding metathesis metal in the remanent reduction liquid of de-golding. The pH value of remanent reduction liquid was adjusted to 0~2, and the replacement reaction temperature was 10~50° C. Until the pH value of remanent reduction liquid was adjusted to 2.5~3, stop adding the metathesis metals, which were one or mixed powders of zinc and iron. The recovery ratio of platinum and palladium was above 96%.

6) The slag of de-golding was put in the solution of Na2SO3 to recover silver. The solution and slag of de-silvering were got by filtering. The solution of de-silvering was reduced to rough silver powders. The concentration of Na2SO3 was 100~230 g/L, the solid-to-liquid ratio was 1:5~1:10, and the recovery ratio of silver was above 95%.

7) The slag of de-silvering was heated in the mixed solution of HCl, NaCl and CaCl2 to recover lead. The solution and slag of de-leading were got by filtering. The solution of de-leading was cooled to dissolve out PbCl2, and the residual solution was the remanent reduction liquid of de-leading, which was returned to the process of de-leading. In the process of de-leading, the concentration of HCl was 50~150 g/L, the concentration of NaCl was 200~300 g/L, the concentration of CaCl2 was 10~100 g/L, and the solid-to-liquid ratio was 1:10~1:20. The regeneration process for remanent reduction liquid of de-leading was that adding CaCl2 to make the concentration to 10~100 g/L. The recovery ratio of de-lead was above 95%.

8) The slag of de-leading and NaOH were mixed, which were roasted to recover tin. The solution and slag of de-tinning were got by calcined sands water quenching and filtering. To get Na2SnO3, the solution of de-tinning was evaporated and crystallized. The recovery ratio of tin was above 90%. The quality ratio of the de-leading slag and NaOH was 1:1~10:1, the roasting temperature was 300~600° C., and the roasting time was 0.5~5 h.

The advantages of the complete non-cyanogens wet process for green recycling of WPCB were:

1) This invention used a complete non-cyanogens wet process for green recycling the valuable metals from WPCB, to achieving the separation and extraction of copper, lead, tin, silver and gold, platinum and palladium in the WPCB. The recovery ratios of metals were high. By the Non-cyanogens wet process, it was solved that the environment burden from the using of aqua regia and cyanide, the disadvantages of high energy consumption of pyrogenicprocess, and the high equipment requirement and investment. The invention was friendly to environment, and the solution could be recycled, which greatly reduces the secondary pollution to the environment from the waste water and waste gas.

2) The purpose of this invention was to provide a method to recycle WPCB by using the complete non-cyanogens wet green recycling process. This method included mechanical broken, gravity separation, miscellaneous copper powders smelting, copper electrolytic purification, copper anode slime for recovering the valuable metals (such as copper, gold, silver, platinum and palladium, lead and tin), and waste water recycling. Not only separating WPCB metals and nonmetals efficiently, but also no aqua regia and cyanide were used. Cu, Sn, Pb, Ag, Au, Pt and Pd were separated and extracted step-by-step, achieving the goal of non-cyanogens wet process for green recycling of WPCB finally. For this method, the recovery ratios of metals were high and the waste water could be recycled, no secondary pollution, and the equipment was simple. It was easy to be used in industrial production.

DETAILED DESCRIPTION

With the illustration, the following was to explain the complete non-cyanogens wet process for green recycling of WPCB further by specific examples.

Example 1

Figure 1:
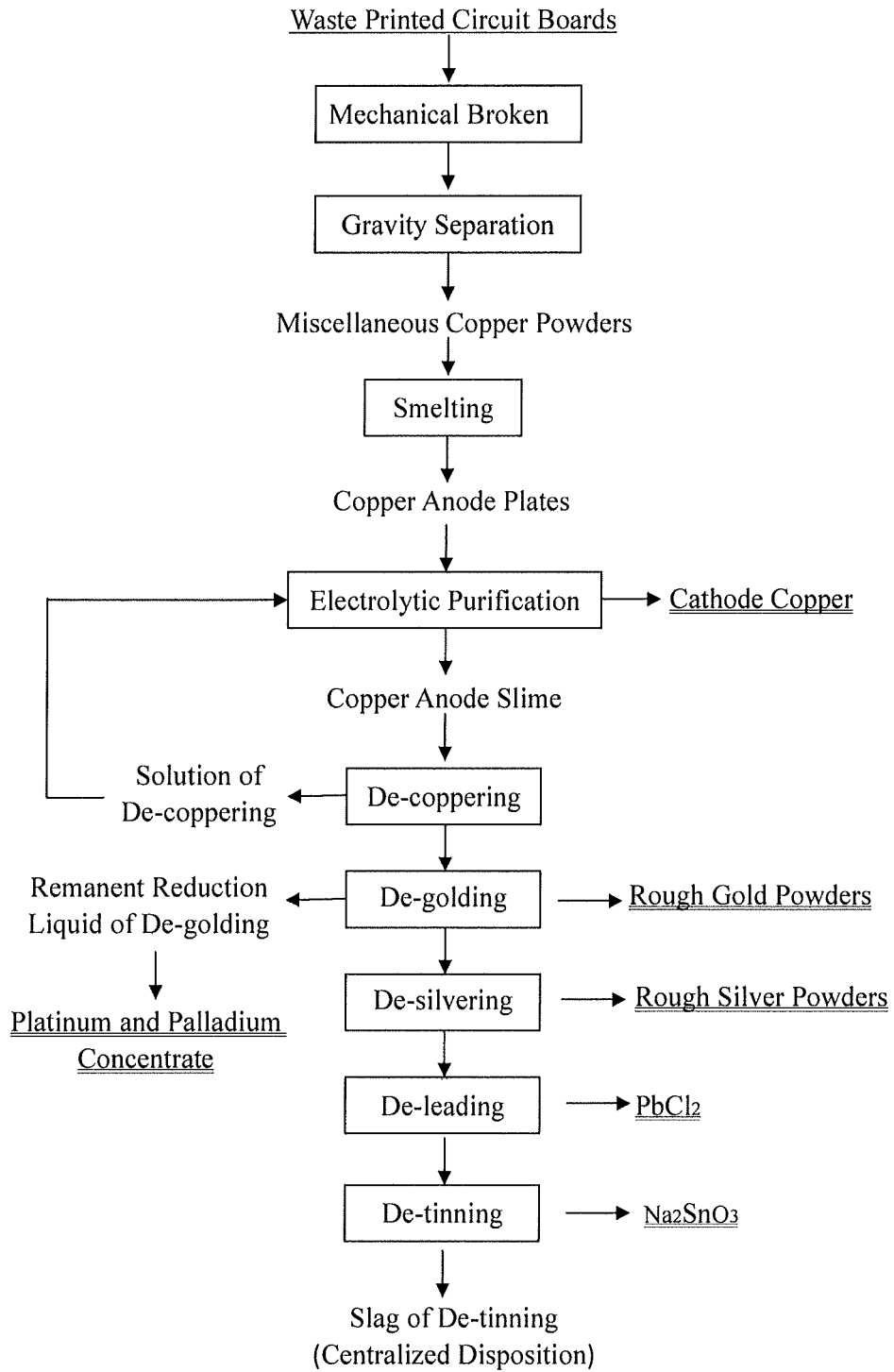
FIG. 1 shows the whole implementation process flow diagram of the complete non-cyanogens wet process for green recycling of WPCB in the invention.

FIG. 1 was the whole implementation process flow diagram of the complete non-cyanogens wet process for green recycling of WPCB in the invention. As was shown in FIG. 1, WPCB were broken by the jaw crusher, and then mixed copper powders and nonmetallic powders were separated by the method of air classification. The mixed copper powders were smelted and casted to get copper anode plates.

The copper anode plates were put in the mixed solution of $CuSO_4$ and $H_2SO_4$ to be electrolyzed and purified, and then to get cathode copper and copper anode slime. In the process of copper electrolyzation and purification, the concentration of $H_2SO_4$ was 0.5 mol/L, the concentration of $CuSO_4$ was 1.5 mol/L, the concentration of gelatin was 100 mg/L, the concentration of thiourea was 120 mg/L, the current density is 130 A/m2, and electrolytic temperature was 60° C. The purity of the cathode copper was up to 4N level.

Figure 2:
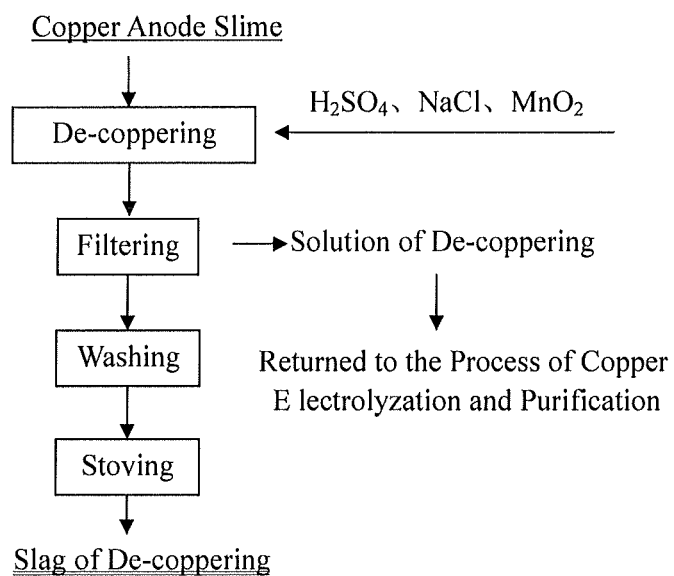
FIG. 2 shows the process flow diagram of recovering copper from anode slime in the invention.

FIG. 2 was the process flow diagram of recovering copper from anode slime in the invention. Mixing copper anode slime with the solution of $H_2SO_4$ and NaCl, $MnO_2$ was added to recover copper. The solution and slag of de-coppering were got by filtering. The solution of de-coppering was returned to the process of copper electrolyzation and purification. In the process of de-coppering, the concentration of $H_2SO_4$ was 0.5 mol/L, the concentration of NaCl was 0.1 mol/L, the amount of $MnO_2$ added was 2% of anode slime, the solid-to-liquid ratio was 1:8, the reaction temperature was 80° C., and the reaction time was 4 h. The ratio of de-coppering was 96.7%.

Figure 3:
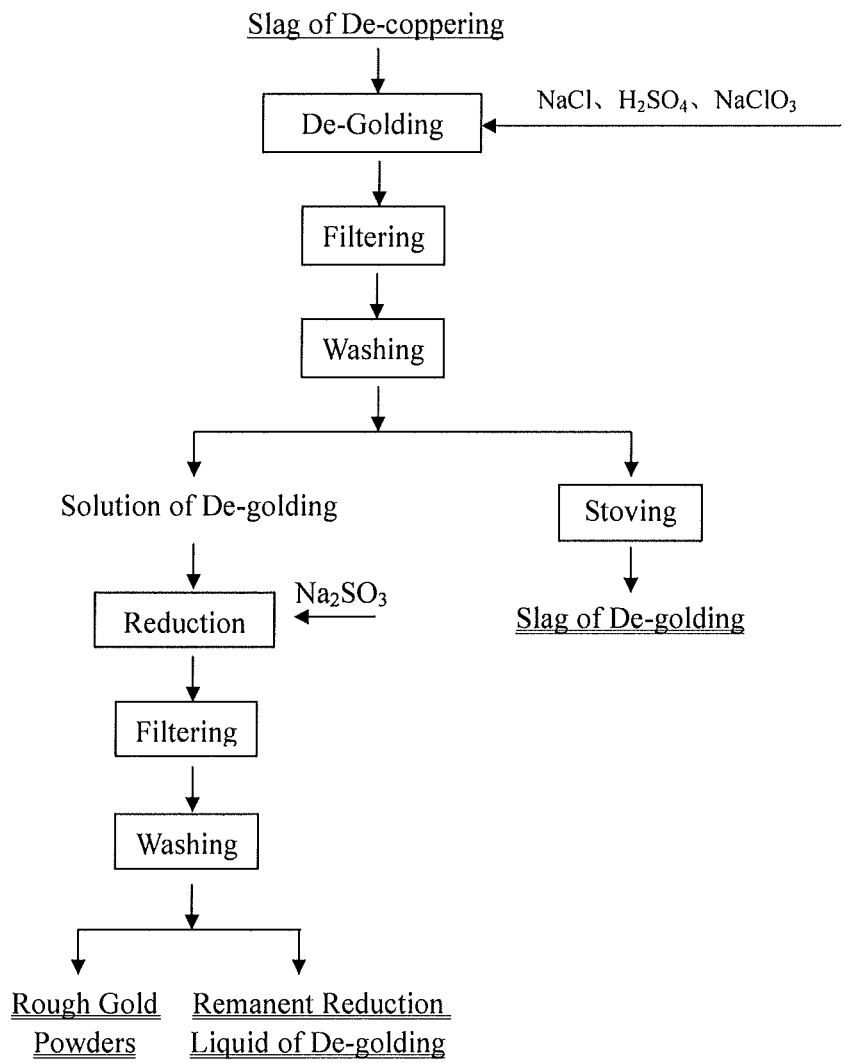
FIG. 3 shows the process flow diagram of recovering gold in the invention.

FIG. 3 was the process flow diagram of recovering gold in the invention. The slag of de-coppering was put in the mixed solution of NaCl, $H_2SO_4$ and $NaClO_3$ to recover gold. The solution and slag of de-golding were got by filtering. The solution of de-golding was reduced to rough gold powders by $Na_2SO_3$ and the residual solution was the remanent reduction liquid of de-golding. In the process of de-golding, the concentration of NaCl was 100 g/L, the concentration of $H_2SO_4$ was 50 g/L, the molar ratio of $NaClO_3$ and NaCl was 2:5, the solid-to-liquid ratio was 1:10, the reaction temperature was 65° C., reaction time was 0.5 h. The concentration of $Na_2SO_3$ for gold reduced was 140 g/L, the reduction temperature was 20° C., and the reduction time was 10 min. The recovery ratio of gold was 98.5%.

Figure 4:
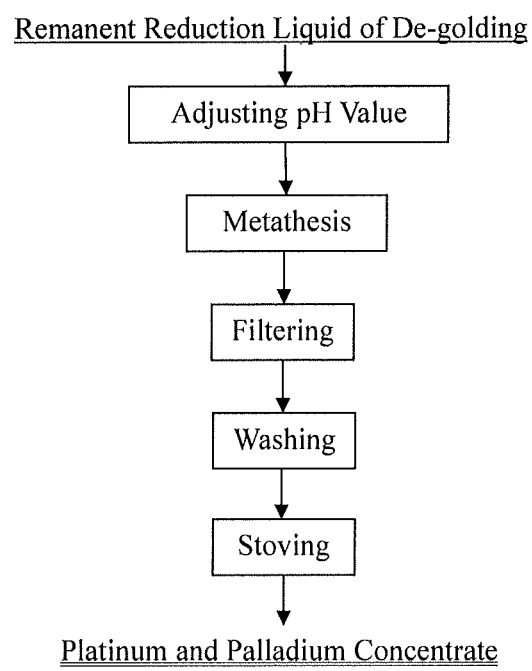
FIG. 4 shows the process flow diagram of recovering platinum and palladium in the invention.

FIG. 4 was the process flow diagram of recovering platinum and palladium in the invention. Platinum and palladium concentrate was obtained by metathesis in the remanent reduction liquid of de-golding. The pH value of remanent reduction liquid was adjusted to 0, and the replacement reaction temperature was 20° C. Until the pH value of remanent reduction liquid was adjusted to 2.5, stop adding the metathesis metals, which were zinc powders. The recovery ratio of platinum and palladium was 96.2%.

Figure 5:
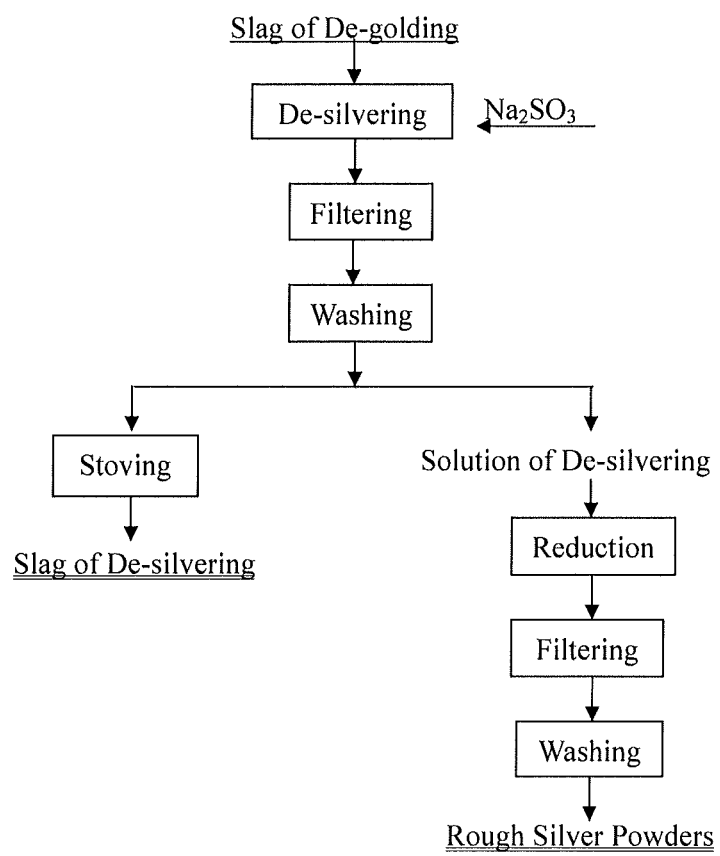
FIG. 5 shows the process flow diagram of recovering silver in the invention.

FIG. 5 was the process flow diagram of recovering silver in the invention. The slag of de-golding was put in the solution of $Na_2SO_3$ to recover silver. The solution and slag of de-silvering were got by filtering. The solution of de-silvering was reduced to rough silver powders. The concentration of $Na_2SO_3$ was 140 g/L, the solid-to-liquid ratio was 1:10, the reaction temperature was 20° C., the reaction time was 5 h, and the pH value of de-silvering solution was 14. The reducing agent was formaldehyde. The quality ratio of the reducing agent and silver was 1:4. The recovery ratio of silver was 97%.

Figure 6:
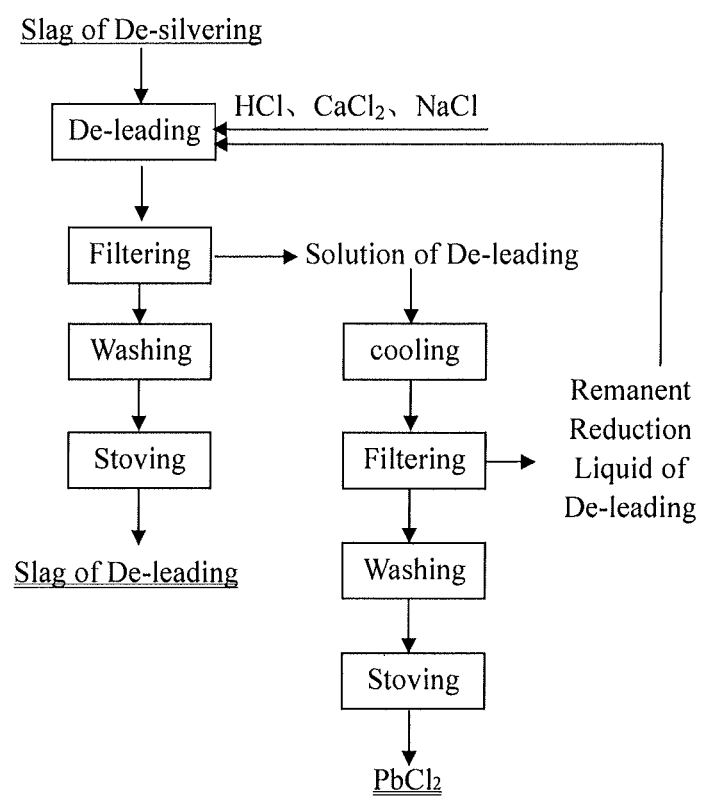
FIG. 6 shows the process flow diagram of recovering lead in the invention.

FIG. 6 was shows the process flow diagram of recovering lead in the invention. The slag of de-silvering was heated in the mixed solution of HCl, NaCl and $CaCl_2$ to recover lead. The solution and slag of de-leading were got by filtering. The solution of de-leading was cooled to dissolve out $PbCl_2$, and the residual solution was the remanent reduction liquid of de-leading, which was returned to the process of de-leading. In the process of de-leading, the concentration of HCl was 10 g/L, the concentration of NaCl was 350 g/L, the concentration of CaCl2 was 20 g/L, the total concentration of chloride ion was 6.4 mol/L, the solid-to-liquid ratio was 1:20, the reaction temperature was 110° C., and the reaction time was 2 h. The regeneration process for remanent reduction liquid of de-leading was that adding CaCl2 to make the concentration to 20 g/L. The recovery ratio of lead was 97%.

Figure 7:
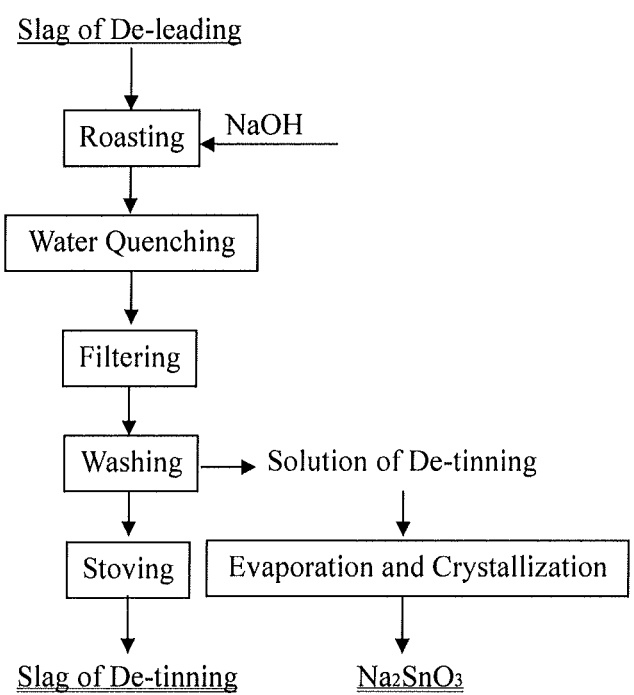
FIG. 7 shows the process flow diagram of recovering tin in the invention.

FIG. 7 was the process flow diagram of recovering tin in the invention. The slag of de-leading and NaOH were mixed, which were roasted to recover tin. The solution and slag of de-tinning were got by calcined sands water quenching and filtering. To get Na2SnO3, the solution of de-tinning was evaporated and crystallized. The quality ratio of the de-leading slag and NaOH was 2:1, the roasting temperature was 350° C., and the roasting time was 2 h. The recovery ratio of tin was 94.2%.

Example 2

Firstly, WPCB were broken by the jaw crusher, and then mixed copper powders and nonmetallic powders were separated by the method of air classification. The mixed copper powders were smelted and casted to get copper anode plates.

The copper anode plates were put in the mixed solution of CuSO4 and H2SO4 to be electrolyzed and purified, and then to get cathode copper and copper anode slime. In the process of copper electrolyzation and purification, the concentration of H2SO4 was 2 mol/L, the concentration of CuSO4 was 1 mol/L, the concentration of gelatin was 50 mg/L, the concentration of thiourea was 100 mg/L, the current density is 100 A/m2, and electrolytic temperature was 40° C. The purity of the cathode copper was up to 4N level.

Mixing copper anode slime with the solution of H2SO4 and NaCl, MnO2 was added to recover copper. The solution and slag of de-coppering were got by filtering. The solution of de-coppering was returned to the process of copper electrolyzation and purification. In the process of de-coppering, the concentration of H2SO4 was 2 mol/L, the concentration of NaCl was 3 mol/L, the amount of MnO2 added was 8% of anode slime, the solid-to-liquid ratio was 1:15, the reaction temperature was 70° C., and the reaction time was 1 h. The ratio of de-coppering was 97.1%.

The slag of de-coppering was put in the mixed solution of NaCl, H2SO4 and NaClO3 to recover gold. The solution and slag of de-golding were got by filtering. The solution of de-golding was reduced to rough gold powders by Na2SO3 and the residual solution was the remanent reduction liquid of de-golding. In the process of de-golding, the concentration of NaCl was 40 g/L, the concentration of H2SO4 was 150 g/L, the molar ratio of NaClO3 and NaCl was 1:5, the solid-to-liquid ratio was 1:20, the reaction temperature was 80° C., reaction time was 4 h. The concentration of Na2SO3 for gold reduced was 70 g/L, the reduction temperature was 50° C., and the reduction time was 10 min. The recovery ratio of gold was 98.7%.

Platinum and palladium concentrate was obtained by metathesis in the remanent reduction liquid of de-golding. The pH value of remanent reduction liquid was adjusted to 1, and the replacement reaction temperature was 10° C. Until the pH value of remanent reduction liquid was adjusted to 2.7, stop adding the metathesis metals, which were iron powders. The recovery ratio of platinum and palladium was 96.8%.

The slag of de-golding was put in the solution of Na2SO3 to recover silver. The solution and slag of de-silvering were got by filtering. The solution of de-silvering was reduced to rough silver powders. The concentration of Na2SO3 was 70 g/L, the solid-to-liquid ratio was 1:20, the reaction temperature was 40° C., the reaction time was 0.5 h, and the pH value of de-silvering solution was 14. The reducing agent was oxalic acid. The quality ratio of the reducing agent and silver was 1:2. The recovery ratio of silver was 96.9%.

The slag of de-silvering was heated in the mixed solution of HCl, NaCl and CaCl2 to recover lead. The solution and slag of de-leading were got by filtering. The solution of de-leading was cooled to dissolve out PbCl2, and the residual solution was the remanent reduction liquid of de-leading, which was returned to the process of de-leading. In the process of de-leading, the concentration of HCl was 50 g/L, the concentration of NaCl was 200 g/L, the concentration of CaCl2 was 50 g/L, the total concentration of chloride ion was 5.2 mol/L, the solid-to-liquid ratio was 1:5, the reaction temperature was 90° C., and the reaction time was 3 h. The regeneration process for remanent reduction liquid of de-leading was that adding CaCl2 to make the concentration to 50 g/L. The recovery ratio of lead was 96.2%.

The slag of de-leading and NaOH were mixed, which were roasted to recover tin. The solution and slag of de-tinning were got by calcined sands water quenching and filtering. To get Na2SnO3, the solution of de-tinning was evaporated and crystallized. The quality ratio of the de-leading slag and NaOH was 1:1, the roasting temperature was 300° C., and the roasting time was 4 h. The recovery ratio of tin was 91.8%.

Example 3

Firstly, WPCB were broken by the jaw crusher, and then mixed copper powders and nonmetallic powders were separated by the method of air classification. The mixed copper powders were smelted and casted to get copper anode plates.

The copper anode plates were put in the mixed solution of CuSO4 and H2SO4 to be electrolyzed and purified, and then to get cathode copper and copper anode slime. In the process of copper electrolyzation and purification, the concentration of H2SO4 was 1 mol/L, the concentration of CuSO4 was 0.5 mol/L, the concentration of gelatin was 300 mg/L, the concentration of thiourea was 300 mg/L, the current density is 250 A/m2, and electrolytic temperature was 80° C. The purity of the cathode copper was up to 4N level.

Mixing copper anode slime with the solution of H2SO4 and NaCl, MnO2 was added to recover copper. The solution and slag of de-coppering were got by filtering. The solution of de-coppering was returned to the process of copper electrolyzation and purification. In the process of de-coppering, the concentration of H2SO4 was 1 mol/L, the concentration of NaCl was 4 mol/L, the amount of MnO2 added was 15% of anode slime, the solid-to-liquid ratio was 1:12, the reaction temperature was 90° C., and the reaction time was 0.5 h. The ratio of de-coppering was 97.4%.

The slag of de-coppering was put in the mixed solution of NaCl, H2SO4 and NaClO3 to recover gold. The solution and slag of de-golding were got by filtering. The solution of de-golding was reduced to rough gold powders by Na2SO3 and the residual solution was the remanent reduction liquid of de-golding. In the process of de-golding, the concentration of NaCl was 30 g/L, the concentration of H2SO4 was 200 g/L, the molar ratio of NaClO3 and NaCl was 3:5, the solid-to-liquid ratio was 1:10, the reaction temperature was 70° C., reaction time was 5 h. The concentration of Na2SO3 for gold reduced was 200 g/L, the reduction temperature was 25° C., and the reduction time was 10 min. The recovery ratio of gold was 98.9%.

Platinum and palladium concentrate was obtained by metathesis in the remanent reduction liquid of de-golding. The pH value of remanent reduction liquid was adjusted to 2, and the replacement reaction temperature was 25° C. Until the pH value of remanent reduction liquid was adjusted to 3, stop adding the metathesis metals, which were mixed with zinc powders and iron powders by the quality ratio 1:1. The recovery ratio of platinum and palladium was 97.6%.

The slag of de-golding was put in the solution of $Na_2SO_3$ to recover silver. The solution and slag of de-silvering were got by filtering. The solution of de-silvering was reduced to rough silver powders. The concentration of $Na_2SO_3$ was 200 g/L, the solid-to-liquid ratio was 1:10, the reaction temperature was 20° C., the reaction time was 2 h, and the pH value of de-silvering solution was 12.5. The reducing agent was formaldehyde. The quality ratio of the reducing agent and silver was 1:5. The recovery ratio of silver was 95.7%.

The slag of de-silvering was heated in the mixed solution of HCl, NaCl and $CaCl_2$ to recover lead. The solution and slag of de-leading were got by filtering. The solution of de-leading was cooled to dissolve out $PbCl_2$, and the residual solution was the remanent reduction liquid of de-leading, which was returned to the process of de-leading. In the process of de-leading, the concentration of HCl was 10 g/L, the concentration of NaCl was 200 g/L, the concentration of $CaCl_2$ was 100 g/L, the total concentration of chloride ion was 4.6 mol/L, the solid-to-liquid ratio was 1:15, the reaction temperature was 70° C., and the reaction time was 1 h. The regeneration process for remanent reduction liquid of de-leading was that adding $CaCl_2$ to make the concentration to 100 g/L. The recovery ratio of lead was 95.3%.

The slag of de-leading and NaOH were mixed, which were roasted to recover tin. The solution and slag of de-tinning were got by calcined sands water quenching and filtering. To get $Na_2SnO_3$, the solution of de-tinning was evaporated and crystallized. The quality ratio of the de-leading slag and NaOH was 5:1, the roasting temperature was 500° C., and the roasting time was 0.5 h. The recovery ratio of tin was above 92.1%.

Example 4

Firstly, WPCB were broken by the jaw crusher, and then mixed copper powders and nonmetallic powders were separated by the method of air classification. The mixed copper powders were smelted and casted to get copper anode plates.

The copper anode plates were put in the mixed solution of $CuSO_4$ and $H_2SO_4$ to be electrolyzed and purified, and then to get cathode copper and copper anode slime. In the process of copper electrolyzation and purification, the concentration of $H_2SO_4$ was 1.5 mol/L, the concentration of $CuSO_4$ was 0.2 mol/L, the concentration of gelatin was 100 mg/L, the concentration of thiourea was 70 mg/L, the current density is 500 A/m2, and electrolytic temperature was 40° C. The purity of the cathode copper was up to 4N level.

Mixing copper anode slime with the solution of $H_2SO_4$ and NaCl, $MnO_2$ was added to recover copper. The solution and slag of de-coppering were got by filtering. The solution of de-coppering was returned to the process of copper electrolyzation and purification. In the process of de-coppering, the concentration of $H_2SO_4$ was 5 mol/L, the concentration of NaCl was 0.2 mol/L, the amount of $MnO_2$ added was 30% of anode slime, the solid-to-liquid ratio was 1:20, the reaction temperature was 30° C., and the reaction time was 4 h. The ratio of de-coppering was 98.3%.

The slag of de-coppering was put in the mixed solution of NaCl, $H_2SO_4$ and $NaClO_3$ to recover gold. The solution and slag of de-golding were got by filtering. The solution of de-golding was reduced to rough gold powders by $Na_2SO_3$ and the residual solution was the remanent reduction liquid of de-golding. In the process of de-golding, the concentration of NaCl was 20 g/L, the concentration of $H_2SO_4$ was 150 g/L, the molar ratio of $NaClO_3$ and NaCl was 1:2, the solid-to-liquid ratio was 1:5, the reaction temperature was 95° C., reaction time was 2 h. The concentration of $Na_2SO_3$ for gold reduced was 280 g/L, the reduction temperature was 20° C., and the reduction time was 30 min. The recovery ratio of gold was 98.8%.

Platinum and palladium concentrate was obtained by metathesis in the remanent reduction liquid of de-golding. The pH value of remanent reduction liquid was adjusted to 1.5, and the replacement reaction temperature was 50° C. Until the pH value of remanent reduction liquid was adjusted to 3, stop adding the metathesis metals, which were mixed with zinc powders and iron powders by the quality ratio 2:1. The recovery ratio of platinum and palladium was 97.1%.

The slag of de-golding was put in the solution of $Na_2SO_3$ to recover silver. The solution and slag of de-silvering were got by filtering. The solution of de-silvering was reduced to rough silver powders. The concentration of $Na_2SO_3$ was 280 g/L, the solid-to-liquid ratio was 1:8, the reaction temperature was 50° C., the reaction time was 4 h, and the pH value of de-silvering solution was 12. The reducing agent was oxalic acid. The quality ratio of the reducing agent and silver was 1:1. The recovery ratio of silver was 97.4%.

The slag of de-silvering was heated in the mixed solution of HCl, NaCl and $CaCl_2$ to recover lead. The solution and slag of de-leading were got by filtering. The solution of de-leading was cooled to dissolve out $PbCl_2$, and the residual solution was the remanent reduction liquid of de-leading, which was returned to the process of de-leading. In the process of de-leading, the concentration of HCl was 200 g/L, the concentration of NaCl was 50 g/L, the concentration of $CaCl_2$ was 10 g/L, the total concentration of chloride ion was 6.4 mol/L, the solid-to-liquid ratio was 1:30, the reaction temperature was 80° C., and the reaction time was 5 h. The regeneration process for remanent reduction liquid of de-leading was that adding $CaCl_2$ to make the concentration to 10 g/L. The recovery ratio of lead was 95.2%.

The slag of de-leading and NaOH were mixed, which were roasted to recover tin. The solution and slag of de-tinning were got by calcined sands water quenching and filtering. To get $Na_2SnO_3$, the solution of de-tinning was evaporated and crystallized. The quality ratio of the de-leading slag and NaOH was 10:1, the roasting temperature was 600° C., and the roasting time was 5 h. The recovery ratio of tin was 90.2%.

Example 5

Firstly, WPCB were broken by the jaw crusher, and then mixed copper powders and nonmetallic powders were separated by the method of air classification. The mixed copper powders were smelted and casted to get copper anode plates.

The copper anode plates were put in the mixed solution of $CuSO_4$ and $H_2SO_4$ to be electrolyzed and purified, and then to get cathode copper and copper anode slime. In the process of copper electrolyzation and purification, the concentration of $H_2SO_4$ was 2 mol/L, the concentration of $CuSO_4$ was 0.5 mol/L, the concentration of gelatin was 70 mg/L, the concentration of thiourea was 50 mg/L, the current density is 300 A/m2, and electrolytic temperature was 30° C. The purity of the cathode copper was up to 4N level.

Mixing copper anode slime with the solution of $H_2SO_4$ and NaCl, $MnO_2$ was added to recover copper. The solution and slag of de-coppering were got by filtering. The solution of de-coppering was returned to the process of copper electrolyzation and purification. In the process of de-coppering, the concentration of $H_2SO_4$ was 2.5 mol/L, the concentration of NaCl was 5 mol/L, the amount of $MnO_2$ added was 40% of anode slime, the solid-to-liquid ratio was 1:4, the reaction temperature was 60° C., and the reaction time was 6 h. The ratio of de-coppering was 98.2%.

The slag of de-coppering was put in the mixed solution of NaCl, $H_2SO_4$ and $NaClO_3$ to recover gold. The solution and slag of de-golding were got by filtering. The solution of de-golding was reduced to rough gold powders by $Na_2SO_3$ and the residual solution was the remanent reduction liquid of de-golding. In the process of de-golding, the concentration of NaCl was 70 g/L, the concentration of $H_2SO_4$ was 300 g/L, the molar ratio of $NaClO_3$ and NaCl was 3:5, the solid-to-liquid ratio was 1:4, the reaction temperature was 60° C., reaction time was 1 h. The concentration of $Na_2SO_3$ for gold reduced was 100 g/L, the reduction temperature was 40° C., and the reduction time was 5 min. The recovery ratio of gold was 98.7%.

Platinum and palladium concentrate was obtained by metathesis in the remanent reduction liquid of de-golding. The pH value of remanent reduction liquid was adjusted to 1, and the replacement reaction temperature was 50° C. Until the pH value of remanent reduction liquid was adjusted to 2.5, stop adding the metathesis metals, which were zinc powders. The recovery ratio of platinum and palladium was 96.6%.

The slag of de-golding was put in the solution of $Na_2SO_3$ to recover silver. The solution and slag of de-silvering were got by filtering. The solution of de-silvering was reduced to rough silver powders. The concentration of $Na_2SO_3$ was 110 g/L, the solid-to-liquid ratio was 1:4, the reaction temperature was 40° C., the reaction time was 4 h, and the pH value of de-silvering solution was 12. The reducing agent was formaldehyde. The quality ratio of the reducing agent and silver was 2:3. The recovery ratio of silver was 96.4%.

The slag of de-silvering was heated in the mixed solution of HCl, NaCl and $CaCl_2$ to recover lead. The solution and slag of de-leading were got by filtering. The solution of de-leading was cooled to dissolve out $PbCl_2$, and the residual solution was the remanent reduction liquid of de-leading, which was returned to the process of de-leading. In the process of de-leading, the concentration of HCl was 25 g/L, the concentration of NaCl was 100 g/L, the concentration of $CaCl_2$ was 80 g/L, the total concentration of chloride ion was 3.1 mol/L, the solid-to-liquid ratio was 1:20, the reaction temperature was 95° C., and the reaction time was 0.5 h. The regeneration process for remanent reduction liquid of de-leading was that adding $CaCl_2$ to make the concentration to 80 g/L. The recovery ratio of lead was 95.7%.

The slag of de-leading and NaOH were mixed, which were roasted to recover tin. The solution and slag of de-tinning were got by calcined sands water quenching and filtering. To get $Na_2SnO_3$, the solution of de-tinning was evaporated and crystallized. The quality ratio of the de-leading slag and NaOH was 4:1, the roasting temperature was 550° C., and the roasting time was 0.5 h. The recovery ratio of tin was 92.3%.

Example 6

Firstly, WPCB were broken by the jaw crusher, and then mixed copper powders and nonmetallic powders were separated by the method of air classification. The mixed copper powders were smelted and casted to get copper anode plates.

The copper anode plates were put in the mixed solution of $CuSO_4$ and $H_2SO_4$ to be electrolyzed and purified, and then to get cathode copper and copper anode slime. In the process of copper electrolyzation and purification, the concentration of $H_2SO_4$ was 1 mol/L, the concentration of $CuSO_4$ was 1 mol/L, the concentration of gelatin was 100 mg/L, the concentration of thiourea was 120 mg/L, the current density is 180 A/m2, and electrolytic temperature was 30° C. The purity of the cathode copper was up to 4N level.

Mixing copper anode slime with the solution of $H_2SO_4$ and NaCl, $MnO_2$ was added to recover copper. The solution and slag of de-coppering were got by filtering. The solution of de-coppering was returned to the process of copper electrolyzation and purification. In the process of de-coppering, the concentration of $H_2SO_4$ was 2 mol/L, the concentration of NaCl was 1 mol/L, the amount of $MnO_2$ added was 10% of anode slime, the solid-to-liquid ratio was 1:15, the reaction temperature was 45° C., and the reaction time was 6 h. The ratio of de-coppering was 97.6%.

The slag of de-coppering was put in the mixed solution of NaCl, $H_2SO_4$ and $NaClO_3$ to recover gold. The solution and slag of de-golding were got by filtering. The solution of de-golding was reduced to rough gold powders by $Na_2SO_3$ and the residual solution was the remanent reduction liquid of de-golding. In the process of de-golding, the concentration of NaCl was 60 g/L, the concentration of $H_2SO_4$ was 150 g/L, the molar ratio of $NaClO_3$ and NaCl was 1:3, the solid-to-liquid ratio was 1:15, the reaction temperature was 50° C., reaction time was 1.5 h. The concentration of $Na_2SO_3$ for gold reduced was 150 g/L, the reduction temperature was 10° C., and the reduction time was 30 min. The recovery ratio of gold was 98.4%.

Platinum and palladium concentrate was obtained by metathesis in the remanent reduction liquid of de-golding. The pH value of remanent reduction liquid was adjusted to 0, and the replacement reaction temperature was 25° C. Until the pH value of remanent reduction liquid was adjusted to 2.5, stop adding the metathesis metals, which were iron powders. The recovery ratio of platinum and palladium was 96.5%.

The slag of de-golding was put in the solution of $Na_2SO_3$ to recover silver. The solution and slag of de-silvering were got by filtering. The solution of de-silvering was reduced to rough silver powders. The concentration of $Na_2SO_3$ was 180 g/L, the solid-to-liquid ratio was 1:10, the reaction temperature was 25° C., the reaction time was 2 h, and the pH value of de-silvering solution was 11. The reducing agent was oxalic acid. The quality ratio of the reducing agent and silver was 1:3. The recovery ratio of silver was 96.9%.

The slag of de-silvering was heated in the mixed solution of HCl, NaCl and $CaCl_2$ to recover lead. The solution and slag of de-leading were got by filtering. The solution of de-leading was cooled to dissolve out $PbCl_2$, and the residual solution was the remanent reduction liquid of de-leading, which was returned to the process of de-leading. In the process of de-leading, the concentration of HCl was 50 g/L, the concentration of NaCl was 100 g/L, the concentration of CaCl2 was 300 g/L, the total concentration of chloride ion was 5.8 mol/L, the solid-to-liquid ratio was 1:15, the reaction temperature was 75° C., and the reaction time was 2 h. The regeneration process for remanent reduction liquid of de-leading was that adding CaCl2 to make the concentration to 300 g/L. The recovery ratio of lead was 96.3%.

The slag of de-leading and NaOH were mixed, which were roasted to recover tin. The solution and slag of de-tinning were got by calcined sands water quenching and filtering. To get Na2SnO3, the solution of de-tinning was evaporated and crystallized. The quality ratio of the de-leading slag and NaOH was 7:1, the roasting temperature was 450° C., and the roasting time was 3 h. The recovery ratio of tin was 90.4%.

There were detailed illustration by the examples above of the invention, but only for the better examples of the invention, which can't be limited scope of the invention. All the equalization change and improvement according to the range applied in the invention, shall be still belongs to the range of this invention patent.

What is claimed is:

1. A method of recycling a waste printed circuit board (WPCB) comprising:
   1) breaking the WPCB to obtain a powder mixture, separating a copper powder from the powder mixture by a gravity separation, and casting copper anode plates by smelting the copper powder;
   2) electrolyzing the copper anode plates in an electrolytic bath comprising $CuSO_4$ and $H_2SO_4$ to obtain a cathode copper and a copper anode slime;
   3) performing a de-coppering process that comprises mixing the copper anode slime with a de-coppering solution containing $H_2SO_4$ and NaCl; adding $MnO_2$ into the de-coppering solution; separating a first slag from the de-coppering solution by filtration; and returning a first filtrate after separating the first slag to the electrolytic bath;
   4) performing a de-golding process that comprises putting the first slag in a de-golding solution comprising NaCl, $H_2SO_4$ and $NaClO_3$; separating a second slag from the de-golding solution by filtration; reducing a second filtrate after separating the second slag by $Na_2SO_3$ to obtain rough gold powders, wherein a residual solution of the second filtrate after removing rough gold powders is a first remanent reduction liquid;
   5) performing a process of obtaining a platinum and palladium concentrate that comprises adjusting a pH value of the first remanent reduction liquid to 0-2; adding a metathesis metal into the first remanent reduction liquid until the pH value thereof reaches 2.5-3, wherein the metathesis metal is zinc, iron, or a mixture thereof;
   6) performing a de-silvering process that comprises: putting the second slag in a de-silvering solution comprising $Na_2SO_3$; separating a third slag from the de-silvering solution by filtration, and reducing a third filtrate after separating the third slag to obtain rough silver powders;
   7) performing a de-leading process that comprises heating the third slag in a de-leading solution comprising HCl, NaCl and $CaCl_2$; separating a fourth slag from the de-leading solution by filtration; cooling a fourth filtrate to precipitate out $PbCl_2$; separating the $PbCl_2$ solids from the fourth filtrate to obtain a second remanent reduction liquid and returning the second remanent reduction liquid to the de-leading solution; and
   8) performing a de-tinning process that comprises mixing the fourth slag and NaOH to obtain a mixture; roasting the mixture; quenching the roasted mixture by water to obtain a de-tinning solution; separating a fifth slag from the de-tinning solution by filtration; and evaporating a fifth filtrate after separating the fifth slag to obtain $Na_2SnO_3$.

2. The method of claim 1, wherein the electrolytic bath has a $H_2SO_4$ concentration of 0.5-2 mol/L, a $CuSO_4$ concentration of 0.2-1.5 mol/L, a gelatin concentration of 50-300 mg/L, a thiourea concentration of 50-300 mg/L, a current density of 100-500 $A/m^2$, and an electrolytic temperature of 30-80° C.

3. The method of claim 2, wherein the electrolytic bath has the $H_2SO_4$ concentration of 1-2 mol/L, the $CuSO_4$ concentration of 0.5-1 mol/L, the gelatin concentration of 50-100 mg/L, and the thiourea concentration of 100-150 mg/L.

4. The method of claim 1, wherein the de-coppering solution has a $H_2SO_4$ concentration of 0.5-5 mol/L, a NaCl concentration of 0.1-5 mol/L, an amount of $MnO_2$ at 2-40% of a weight of the anode slime, a solid-to-liquid ratio of 1:4-1:20, wherein the de-coppering process has a reaction temperature of 30-90° C., and a reaction time of 0.5-5 h.

5. The method of claim 4, wherein the de-coppering solution has the $H_2SO_4$ concentration of 1-2 mol/L, the NaCl concentration of 0.5-2 mol/L, the amount of $MnO_2$ at 10-20% of the weight of the anode slime, and the solid-to-liquid ratio of 1:5-1:10.

6. The method of claim 1, wherein the de-golding solution has a NaCl concentration of 20-100 g/L, a $H_2SO_4$ concentration of 50-300 g/L, a molar ratio of $NaClO_3$ and NaCl of 1:5-3:5, a solid-to-liquid ratio of 1:4-1:20, wherein the de-golding process has a reaction temperature of 50-95° C., a reaction time of 0.5-5 h, a $Na_2SO_3$ concentration of 70-280 g/L, a reduction temperature of 10-50° C., and a reduction time of 5-60 min.

7. The method of claim 6, wherein the de-golding solution has a NaCl concentration of 20-100 g/L, the $H_2SO_4$ concentration of 100-200 g/L, the solid-to-liquid ratio of 1:5-1:10, and wherein the concentration of $Na_2SO_3$ used for reducing the second filtrate is 150-250 g/L.

8. The method of claim 1, wherein the de-silvering solution has a $Na_2SO_3$ concentration of 70-280 g/L, a solid-to-liquid ratio of 1:4-1:20, a pH value of 11-14, a reducing agent that is formaldehyde or oxalic acid at a mass ratio of the reducing agent to silver of 1:5-5:5, wherein the de-silvering process has a reaction temperature of 20-50° C. and a reaction time of 0.5-5 h.

9. The method of claim 8, wherein the de-silvering solution has the $Na_2SO_3$ concentration of 100-230 g/L and the solid-to-liquid ratio of 1:5-1:10.

10. The method of claim 1, wherein in the de-leading solution has a HCl concentration of 10-200 g/L, a NaCl concentration of 50-350 g/L, a $CaCl_2$ concentration of 10-300 g/L, a total concentration of chloride ion of 3-6.5 mol/L, a solid-to-liquid ratio of 1:5-1:30, wherein the de-leading process has a reaction temperature is 70-110° C., and a reaction time is 0.5-5 h.

11. The method of claim 10, wherein in the de-leading solution has a HCl concentration of 50-150 g/L, the NaCl concentration of 200-300 g/L, the $CaCl_2$ concentration of 10-100 g/L, and the solid-to-liquid ratio of 1:10-1:20.

12. The method of claim 1, further comprising adding $CaCl_2$ to the second remanent reduction liquid of the de-leading process so that the $CaCl_2$ concentration in the second remanent reduction liquid reaches 10-300 g/L.

13. The method of claim 12, wherein the $CaCl_2$ concentration in the second remanent reduction liquid reaches 10-100 g/L.

14. The method of claim 1, employing no aqua regia or cyanide.

15. The method of claim 1, wherein the copper anode slime comprises $PbSO_4$, $SnO_2$, $Ag_2SO_4$, copper, and a noble metal that is gold, platinum, or palladium.

16. The method of claim 1, wherein in step 8), a mass ratio of the fourth slag and NaOH is 1:1-10:1, a roasting temperature is 300-600° C., and a roasting time is 0.5-5 h.

17. The method of claim 1, wherein the metathesis metal is zinc.

18. The method of claim 1, wherein the third filtrate is reduced using formaldehyde.

* * * * *